(12) United States Patent
Ridet

(10) Patent No.: US 10,597,111 B2
(45) Date of Patent: *Mar. 24, 2020

(54) SYSTEM AND METHOD FOR DYNAMIC MOTORCYCLE FRAME

(71) Applicant: Peter Tristan Ridet, San Francisco, CA (US)

(72) Inventor: Peter Tristan Ridet, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/420,163

(22) Filed: May 23, 2019

(65) Prior Publication Data

US 2019/0276111 A1   Sep. 12, 2019

Related U.S. Application Data

(63) Continuation of application No. 14/882,096, filed on Oct. 13, 2015, now Pat. No. 10,336,397.

(60) Provisional application No. 62/097,513, filed on Dec. 29, 2014.

(51) Int. Cl.
| | |
|---|---|
| *B62K 25/04* | (2006.01) |
| *B62J 99/00* | (2020.01) |
| *B62D 21/15* | (2006.01) |
| *B62K 25/06* | (2006.01) |
| *B62K 11/04* | (2006.01) |

(52) U.S. Cl.
CPC .............. *B62K 25/04* (2013.01); *B62D 21/15* (2013.01); *B62J 99/00* (2013.01); *B62K 11/04* (2013.01); *B62K 25/06* (2013.01); *B62K 2025/044* (2013.01)

(58) Field of Classification Search
CPC .............. B62K 25/04; B62K 2025/041; B62K 2025/044; B62K 25/283; B62K 11/02; B62K 11/04; B62J 99/00; B62D 21/15
See application file for complete search history.

(56) References Cited

U.S. PATENT DOCUMENTS

| | | |
|---|---|---|
| 3,269,480 A | 8/1966 | Kirby |
| 3,459,441 A | 8/1969 | Hornsby |
| 3,687,438 A | 8/1972 | Rickard |
| 3,877,539 A | 4/1975 | Tilkens |
| 4,147,371 A | 4/1979 | Morita et al. |

(Continued)

FOREIGN PATENT DOCUMENTS

| | | |
|---|---|---|
| EP | 1671877 A1 | 6/2006 |
| WO | 2014116092 A1 | 7/2014 |

*Primary Examiner* — Ruth Ilan
(74) *Attorney, Agent, or Firm* — Constance F. Ramos

(57) ABSTRACT

A motorcycle having a motorcycle frame that includes one or more frame members with an adjustable mechanism for increasing or decreasing the stiffness of the frame member. By adjusting the stiffness of one or more frame members, the overall stiffness of the motorcycle frame may be increased or decreased. The adjustable mechanism may be controlled by an actuator, such as a hydraulic pump, that is, in turn, controlled by a computer control system. The control system may include sensors for determining performance parameters while the motorcycle is in use. For example, a speedometer may sense motorcycle speed and a gyrometer may sense the orientation of the motorcycle when in turns. Thus, in one example, the stiffness of the motorcycle frame may be increased if the motorcycle speed reaches a threshold speed. Further, the stiffness may be increased if the gyrometer senses that the motorcycle is engaged in a power slide.

2 Claims, 4 Drawing Sheets

(56) References Cited

U.S. PATENT DOCUMENTS

| | | |
|---|---|---|
| 4,679,811 A | 7/1987 | Shuler |
| 5,143,390 A | 9/1992 | Goldsmith |
| 5,498,013 A | 3/1996 | Hwang |
| 5,775,469 A | 7/1998 | Kang |
| 5,816,356 A | 10/1998 | Jansson et al. |
| 6,135,474 A | 10/2000 | Nakamura |
| 6,206,460 B1 | 3/2001 | Seeliger et al. |
| 6,238,017 B1 | 5/2001 | Eitel |
| 6,364,399 B1 | 4/2002 | Gibby |
| 6,505,847 B1 | 1/2003 | Greene |
| 6,837,328 B2 | 1/2005 | Neugebauer et al. |
| 6,899,193 B1 | 5/2005 | Anibas |
| 7,207,585 B2 | 4/2007 | Czysz |
| 7,232,002 B2 | 6/2007 | Taya et al. |
| 7,533,895 B2 | 5/2009 | Beal |
| 7,546,894 B1 | 6/2009 | Glenn |
| 7,669,918 B2 | 3/2010 | Buravalla et al. |
| 7,694,985 B2 | 4/2010 | Hoshi |
| 7,735,909 B2 | 6/2010 | Satou et al. |
| 7,975,799 B2 | 7/2011 | James et al. |
| 7,980,347 B2 | 7/2011 | Nagao et al. |
| 8,047,587 B2 | 11/2011 | Sawai |
| 8,113,322 B2 | 2/2012 | Arnott |
| 8,181,981 B2 | 5/2012 | Stenberg |
| 8,662,228 B2 | 3/2014 | Hill et al. |
| 8,939,458 B2 | 1/2015 | Nesbitt, III |
| 9,150,274 B1 | 10/2015 | Musto |
| 9,334,007 B2 | 5/2016 | Huennekens et al. |
| 9,382,966 B2 | 7/2016 | Nakajima et al. |
| 9,440,504 B2 | 9/2016 | Bagnariol et al. |
| 9,527,545 B2 | 12/2016 | Juarez et al. |
| 10,046,830 B2 | 8/2018 | Sawai |
| 2004/0124604 A1 | 7/2004 | Takano |
| 2005/0206117 A1 | 9/2005 | Temmerman et al. |
| 2007/0010919 A1 | 1/2007 | Ammon |
| 2007/0182146 A1 | 8/2007 | Browne et al. |
| 2009/0057048 A1 | 3/2009 | Chien et al. |
| 2009/0066115 A1 | 3/2009 | Browne et al. |
| 2009/0205893 A1 | 8/2009 | Pang |
| 2011/0148071 A1 | 6/2011 | Battlogg et al. |
| 2011/0175318 A1 | 7/2011 | Rae |
| 2011/0274910 A1 | 11/2011 | Kraushaar |
| 2012/0146311 A1 | 6/2012 | Williams |
| 2013/0180792 A1 | 7/2013 | Toftner |
| 2014/0249720 A1 | 9/2014 | Sintorn et al. |
| 2014/0316652 A1 | 10/2014 | Erickson et al. |
| 2016/0368559 A1 | 12/2016 | Voss |

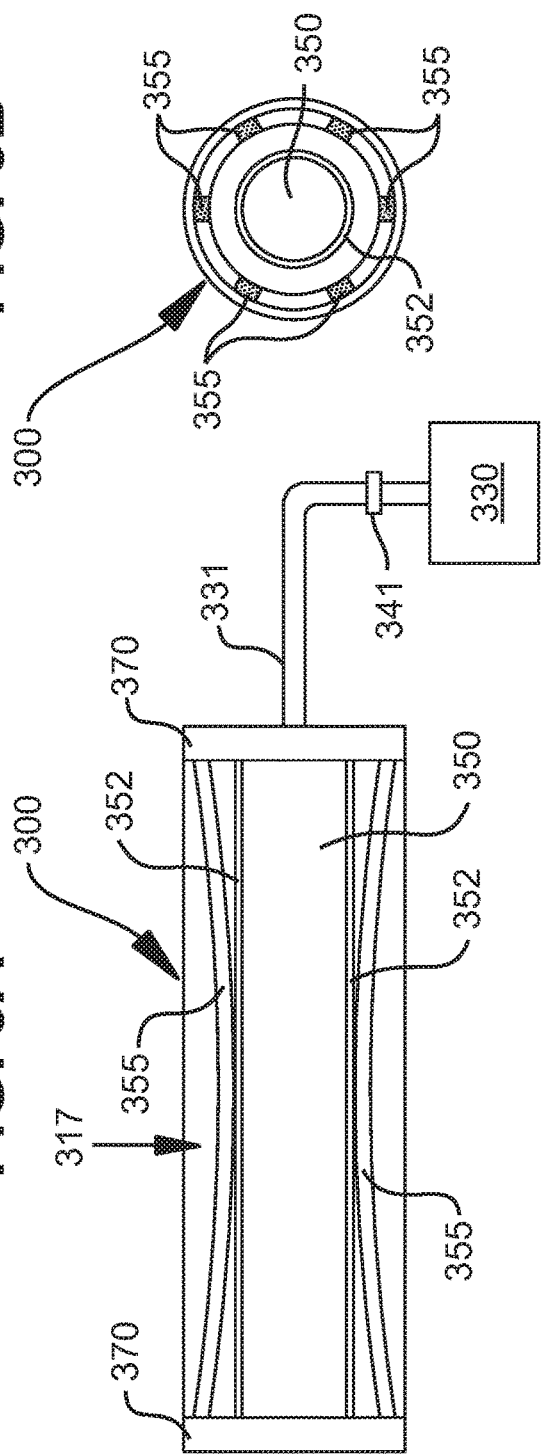

SYSTEM AND METHOD FOR DYNAMIC MOTORCYCLE FRAME

CROSS-REFERENCE TO RELATED APPLICATIONS

This application is a continuation of U.S. patent application Ser. No. 14/882,096, titled "SYSTEM AND METHOD FOR DYNAMIC MOTORCYCLE FRAME," filed Oct. 13, 2015 and naming Peter Tristan Ridet as inventor, which in turn claims the benefit of U.S. Provisional Application No. 62/097,513, titled "System and Method for Dynamic Motorcycle Frame," filed Dec. 29, 2014. Each of the foregoing applications is hereby incorporated herein by reference in its entirety for all purposes.

BACKGROUND

Motorcycles have been around for over a century and are enjoyed the world over by enthusiasts, professionals, and connoisseurs, alike. As an enthusiast's interest grows, high-performance motorcycles are available for both racing events and touring in general. With high-performance expectations, high-performance accessories and parts are expected. For example, high-performance, high-horsepower engines for motorcycles are available for enthusiast's to enjoy speed and power.

When high-performance motorcycle frames are needed for negotiating high-speed turns and the like, specific frames designed for specific high-performance maneuvering are available. Such high-performance frames may exhibit a material that is substantially more rigid (e.g., has a high degree of stiffness) so as to only provide flexibility when the motorcycle is engaged in high-speed turns that exhibit significant forces on frame members of the motorcycle frame. However, for everyday street use, such high-performance frames are, at times, too stiff and do not provide a comfortable ride for simple touring or street use.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

FIGS. 3A/3B are diagrams of a dynamic stiffness motorcycle frame member cross-sections having a hydraulic chamber mechanism according to an embodiment of the subject matter disclosed herein.

FIGS. 4A/4B are diagrams of a dynamic stiffness motorcycle frame member cross-sections having a carbon steel band mechanism according to an embodiment of the subject matter disclosed herein.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Prior to any discussion of the figures of the specification, a brief overview of the subject matter is presented. Motorcycle frames are designed to provide an appropriate level of rigidity and flexibility for specific uses. For example, racing motorcycles will have frames that exhibit a high degree of stiffness while dirt bikes have motorcycle frames that exhibit a lower degree of stiffness. When a motorcycle is to be used for a mixed use scenario (e.g., a touring motorcycle that has high-performance capabilities), different frame parameters may be desired during operation. An embodiment of the subject matter disclosed herein provides a control system and motorcycle frame that may have a stiffness of one or more frame members adjusted while in use.

In one embodiment, a motorcycle may be equipped with a motorcycle frame that has one or more frame members with an adjustable mechanism for increasing or decreasing the stiffness of the frame member. By adjusting the stiffness of one or more frame members, the overall stiffness of the motorcycle frame may be increased or decreased. The adjustable mechanism may be controlled by an actuator, such as a hydraulic pump, that is, in turn, controlled by a computer control system. The control system may include sensors for determining performance parameters while the motorcycle is in use. For example, a speedometer may sense motorcycle speed and a gyrometer may sense the orientation of the motorcycle when in turns. Thus, in one example, the stiffness of the motorcycle frame may be increased if the motorcycle speed reaches a threshold speed. Further, the stiffness may be increased if the gyrometer senses that the motorcycle is engaged in a power slide. These and other aspects are described below with respect to FIGS. 1-5.

Figure 1:
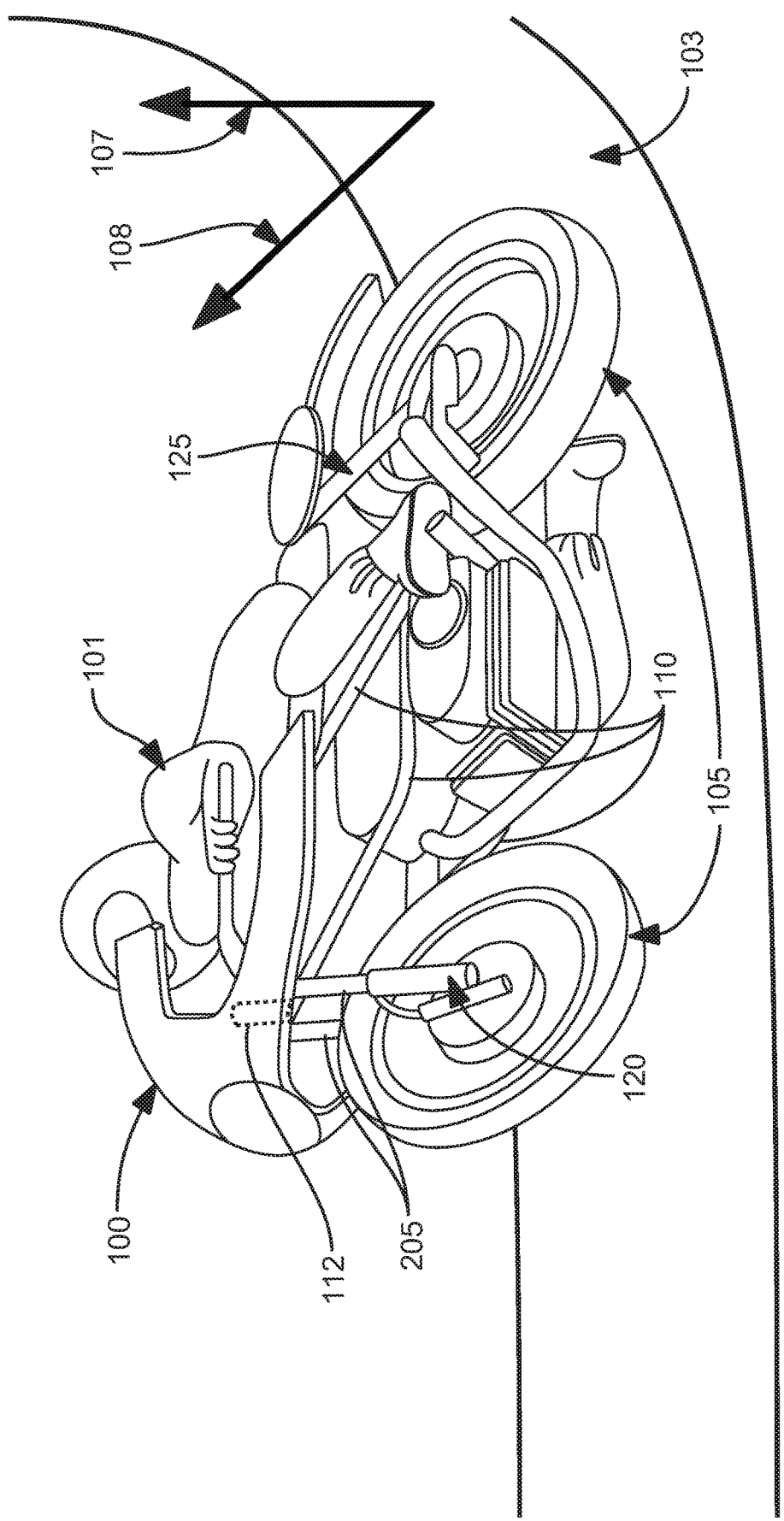
FIG. 1 is an illustration of a motorcycle and rider engaged in a high-speed turn according to an embodiment of the subject matter disclosed herein.

FIG. 1 is an illustration of a motorcycle 100 and rider 101 engaged in a high-speed turn according to an embodiment of the subject matter disclosed herein. Motorcycles, generally defined, are motorized vehicles having two or three wheels (e.g. 105 and generally include suspensions and frames that are similar to just about any other motor vehicle. Thus, a motorcycle frame 110 provides durable and rigid members (for example, members made of steel or aluminum) that include mechanical interfaces (e.g. steering head 112 and front wheel forks 205) for wheels 105 to attach. Further, a motorcycle 100 may typically include shock absorbers 120 (shocks) and struts 125 to assist with absorbing bumps in the road 103 encountered by the wheels 105.

The wheels 105, shocks 120, and struts 125 provide for a more fluid or smooth ride over roads and terrain. As one expects, the shocks 120 and struts 125 are vertical in orientation and provide the best absorption of road and terrain anomalies when the motorcycle 100 is balanced vertically. That is, the shocks 120 and struts 125 designed to absorb bumps from the road 103 are aligned vertically wherein, in this context, vertical direction 107 refers to a direction normal to a flat road 103 such that the alignment of the motorcycle 100 is typically aligned with gravitational forces when being maneuvered in a straight line or at low speeds.

As any motorcycle enthusiast understands, when turns are encountered, a rider 101 may lean into a turn, thereby changing the orientation of the motorcycle 100 from the vertical direction 107 to as much as 45 degrees of lean to the right or left. The rider 101 depicted in FIG. 1 is engaged in a power slide turn wherein the orientation of the motorcycle 100 is in a leaning direction 108 that is approximately 30 degrees from the vertical direction 107. When the motorcycle 100 is no longer in the vertical direction 107 (i.e., no longer aligned with gravitational forces), the shocks 120 and struts 125 do not absorb as much of the forces triggered by anomalies in the road 103. The result is that bumps and rough terrain are felt more by the rider 101 in turns when the rider 101 is in a leaning direction 108 as compared to the vertical direction 107. Therefore, the motorcycle frame 110 may "absorb" more of the bumps in such deep turns.

A conventional motorcycle frame may be designed to have a specific stiffness suited for a particular focus. As used herein, stiffness, generally speaking, is the rigidity of an object. Such stiffness may be measured as the extent to which an object resists deformation in response to an applied force and is commonly measured in Newtons per meter of deflection. The complementary concept is flexibility or pliability; the more flexible an object is, the less stiff it is. For example, dirt bikes may have a very flexible frame to assist with absorbing rough terrain typically encountered. In road-touring motorcycles, the stiffness may be somewhat high so as to provide stability at highway speeds. Racing motorcycles may have the highest stiffness so as to provide great stability in high stress turns. However, motorcycle frames with high-performance stiffness may be too stiff for cruising and general street use, leaving the rider "feeling every crack in the road." As discussed below, a dynamic motorcycle frame 110 having a suspension system that may be tuned for a particular use before and during operation is shown. Thus, increasing the stiffness of an object such as a motorcycle frame member is to increase the force required to bend the object.

Figure 2:
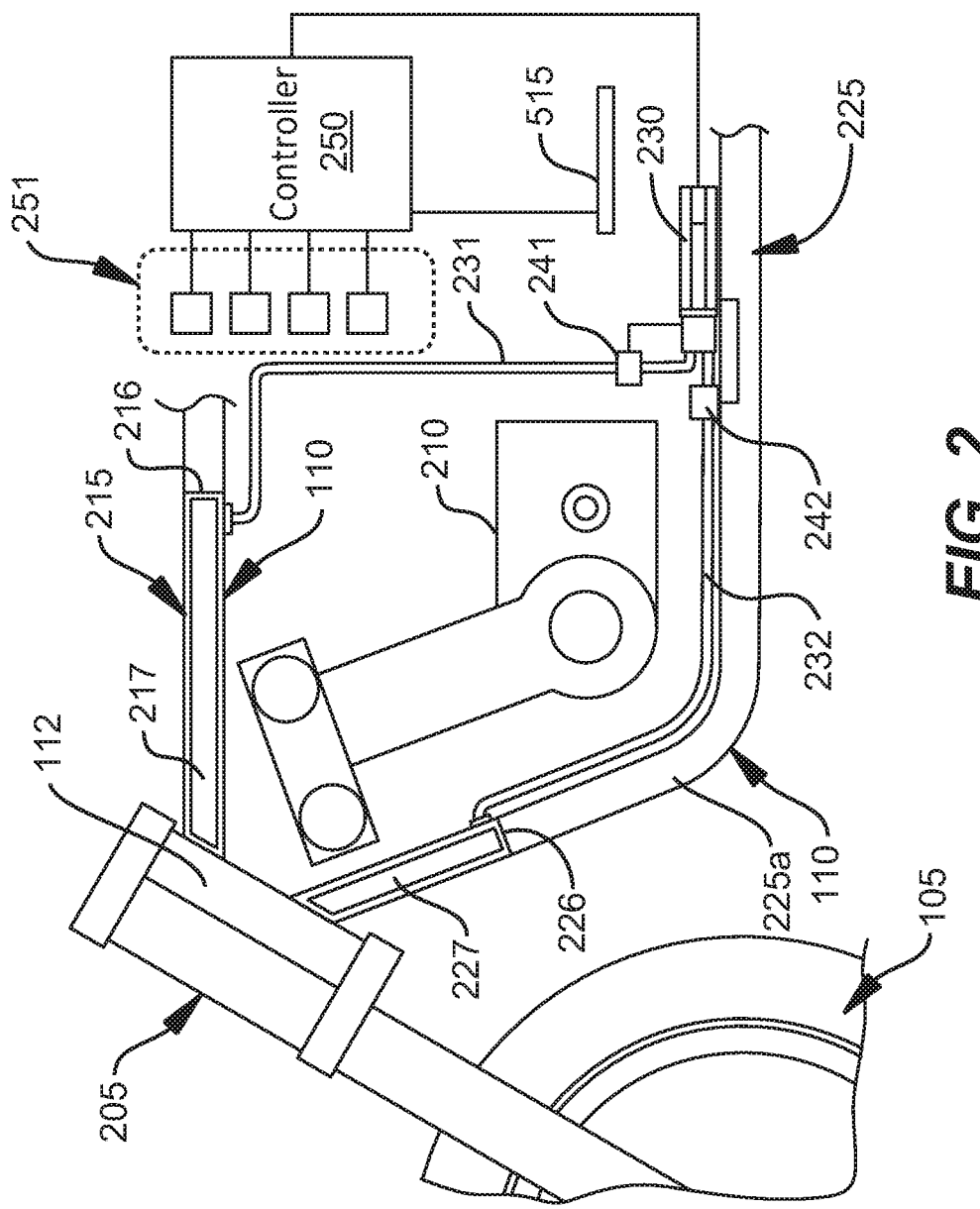
FIG. 2 is a diagram of a portion (side view) of the dynamic stiffness motorcycle frame of FIG. 1 according to an embodiment of the subject matter disclosed herein.

FIG. 2 is a diagram of a side view portion of the dynamic stiffness motorcycle frame 110 as shown in FIG. 1 according to an embodiment of the subject matter disclosed herein. The motorcycle frame 110 may typically include several integral members attached to each other in a manner suited to provide structural support for other parts of the motorcycle. For example, as shown in FIG. 2, the portion of the motorcycle frame 110 shown provides structural attachment points and support for a set of front wheel forks 205 and a front wheel 105 as well as structural attachment points and support for a motor 210. There are countless styles and version of motorcycle frames having multiple members attached together in multiple ways. In one embodiment, for example, a top frame member 215 may comprise a square backbone tube of two inches with another square tube which is split on four sides for a good portion of its length to allow for expansion. Thus, from outside to center, this motorcycle frame 110 embodiment may include a two inch square tube, a square tube split on the center of a flat face, a hollow chamber 216 (as discussed below), and an expandable hydraulic chamber (as discussed below). The front end of the motorcycle frame 110 may further be contoured so as to brace and lock against a steering head 112 to assist with controlling torsional forces.

In another embodiment, not shown, the motorcycle frame 110 may include an "A" plate of aluminum which can be bolted to two forward down tubes (e.g. 225*a*, FIG. 2). The A plate is used to set a lower end of frame flex when the backbone (top frame member 215, FIG. 2) is not loaded. There can be a range of A plate sizes that can be swapped out for adjusting the level and range of flexibility desired. Further yet, additional aspects of the motorcycle frame 110 may include a swappable torsion bar that can be inserted to compensate for situations where computer-controlled flexibility may not be allowed (e.g., competitive racing). For the purposes of this disclosure, the side view portion of the motorcycle frame 110 (FIG. 2) shows at least two members, the top member 215 and a bottom member 225.

Each member of the motorcycle frame 110, including top member 215 and bottom member 225, may comprise an enclosed chamber or cavity. That is, the motorcycle frame members may be hollow tubes or hollow rectangular structures of material, such as steel or aluminum, such that the interior portions of the each member are manufactured to be hollowed out but enclosed. In this manner, a cavity is formed wherein a mechanism for adjusting the stiffness of each member may be incorporated. Such a mechanism may be a hydraulic based mechanism (described below with respect to FIG. 3), a carbon steel band system (FIG. 4) or a magnetorheological fluid system.

Thus, as shown in FIG. 2, the top member 215 includes a hollow chamber 216 that includes a first mechanism 217 for adjusting the stiffness of the top member 215 (and the motorcycle frame 110). Likewise, the bottom member 225 includes a hollow chamber 226 that includes a second mechanism 227 for adjusting the stiffness of the bottom member 225 (and the motorcycle frame 110). Each mechanism 217 and 227 is controllably coupled to one or more actuators 230. The style of actuator 230 will depend on the underlying mechanisms 217 and 227. For example, if the mechanisms 217 and 227 are hydraulic chambers with an adjustable hydraulic ram, then the actuator may be a hydraulic pump. Additional specifics of the actuator 230 are also described below with respect to FIGS. 3-5.

As shown in FIG. 2, there is one actuator 230 shown having a first control link 231 to the top member 215 and having a second control link 232 to the bottom member 225. Further, in this embodiment, each control link 231 and 232 may be further controlled by an individual control element 241 and 242 respectively. The control links 231 and 232 may be hydraulic fluid cables, mechanical actuating lines, magnetorheological fluid lines, or any other linkage that allows an actuator 230 to increase or decrease the relative stiffness of each frame member 215 and 225 by engaging the mechanism enclosed therein. In the case of a fluid line then, the control elements 241 and 242 may be ball valves or the like. Further yet, the actuator 230 may be communicatively coupled to a controller 250. The controller 250 may receive input signals from sensors 251 attached to the motorcycle frame 110 and other motorcycle parts. In FIG. 2, the sensors 251 are simply shown generically, but are discussed in greater detail with respect to the controller 501 in FIG. 5. Prior to discussing the control techniques, various embodiments of the mechanisms 217 and 227 enclosed in frame members 215 and 225 (respectively) are discussed next with respect to FIGS. 3-4.

FIG. 3A is a cutaway diagram of a dynamic stiffness motorcycle frame member 300 having a hydraulic chamber mechanism 317 according to an embodiment of the subject matter disclosed herein. In this embodiment, the motorcycle frame 110 may include one or more hydraulic chambers 350 within one or more motorcycle frame members. The hydraulic chamber 350 may be enclosed within a hollow portion of a frame member 300 with a control link 331 coupled to the hydraulic chamber 350. In this case, the control link 331 is a hydraulic fluid line coupled to a hydraulic pump 330 that draws power from the engine and can be regulated by a pressure regulator controlled by the controller 250. Further, the actuator may control a valve 341 in the hydraulic fluid line, control link 331.

The hydraulic chamber 350 may be sized slightly smaller than the frame member 300 such that the hydraulic chamber mechanism 317 fits inside the cavity of the frame member 300 but allows enough space for expansion as hydraulic fluid is pumped into the hydraulic chamber 350. In one embodiment, the hydraulic chamber 350 is made of a slightly malleable and expandable material (e.g., Kevlar™ or polypropelene) such that as hydraulic fluid is pumped into a bladder (not shown separately) within the hydraulic chamber, the exterior walls of the hydraulic chamber 350 press up against the interior walls of the frame member 300. The additional stability provided by the now expanded hydraulic chamber 350 imparts additional stiffness to the motorcycle frame member 300.

In another embodiment, the hydraulic chamber mechanism 317 may also include one or more biased stabilizing members 355 inside the frame member 300 and between the exterior walls of the hydraulic chamber 350 and the interior walls of the frame member 300. Each biased stabilizing member 355 may be an elongated, narrow band of a rigid material (e.g., carbon steel bands) formed to be bowed during a resting state. Thus, the bowing may be set to have a central portion of the biased stabilizing member 355 in contact with the exterior wall of the hydraulic chamber 350 while each end is curved toward the interior wall of the frame member 300. In this manner, as the hydraulic chamber 350 expands, it presses on the central contacting portion of the biased stabilizing member 355. This forces the biased stabilizing member 355 to straighten out thereby applying a force on each end 370 of the frame member 300. The resulting forces applied to the ends 370 of the frame member 300 impart additional stiffness to the frame member 300.

The biased stabilizing members 355 are seen from a cross-section view as shown in FIG. 3B. One can see, in this embodiment, six different biased stabilizing members 355 surrounding the exterior wall 352 of the hydraulic chamber 350. Further, the biased stabilizing members 355 are also shown to be in contact with the interior wall of the frame member. Of course, a skilled artisan understands that this is the cross-section view and the shape of the biased stabilizing members 355 with the bowed shape at rest can be seen better in the cutaway view of FIG. 3A.

With one or more dynamically adjustable hydraulic chamber mechanism 317 in one or more motorcycle frame members 300, overall stiffness of the motorcycle frame 110 may be varied. Each hydraulic chamber 350 may be collectively or individually pressurized by pumping hydraulic fluid into each hydraulic chamber 350 of the motorcycle frame 110 using the hydraulic pump 330 mounted to the motorcycle frame 110. The hydraulic pump 330 may also be communicatively coupled and controlled by a computer system/controller so as to take into account lean angle, speed, and other control parameters so as to optimize stiffness of the motorcycle frame 110.

For example, at slow speeds, the hydraulic chambers 350 may be pressurized at a low level such that stiffness of the motorcycle frame 110 is not enhanced beyond the stiffness of the steel or aluminum frame itself. As speed increases, the hydraulic pump 330 may increase the pressure inside the hydraulic chambers 350 of the frame members 300 so as to increase stiffness of motorcycle frame 110. Further, if a gyrometer or other sensor senses a lean-in turn (e.g., a power slide), the hydraulic pump 330 may further increase stiffness of the motorcycle frame 110 by further increasing pressure in the hydraulic chambers 350.

Other embodiments may be employed. One such embodiment includes having individual hydraulic rams inside each hydraulic chamber such that the ram may be mechanically moved to increase or decrease hydraulic pressure. In another embodiment, the overall motorcycle may include more than one hydraulic pump 330 for the more than one hydraulic chamber 350. Thus, the control system is suited to provide a complex control algorithm for actuating hydraulic pumps according to specific sensors sensing the conditions of the motorcycle. For example, a first pump may be actuated once the motorcycle speed exceeds 45 MPH and a second pump may be actuated when the speed reaches 60 MPH. Further yet, a third pump may be actuated if a gyrometer senses a power slide turn.

FIGS. 4A and 4B are diagrams of a dynamic stiffness motorcycle frame member 400 having a banded member mechanism 417 according to an embodiment of the subject matter disclosed herein. In this embodiment, the interior chambers of frame member 400 may include carbon steel bands 455 which may be bowed and are positioned lengthwise inside the frame member 400. The banded member mechanism 417 may be enclosed within a hollow portion of a frame member 400 with a control link 431 coupled to a movable actuating disk 450. In this case, the control link 431 is a control line coupled to a mechanical actuator 432 that is, in turn, coupled to a threaded shaft 451 configured to move the actuating disk 450 longitudinally within the frame member 400. The control link 431 is controlled by a control mechanism 430.

The actuating disk 450 may have a circumference that is sized slightly smaller than the interior diameter of the frame member 400 such that the banded member mechanism 417 fits inside the cavity of the frame member 400 but allows enough space for the actuating disk 450 to but pulled toward the center to bias each banded member into a position having more tension. The additional tension imparts additional stiffness to the motorcycle frame member 400. Each carbon steel band 455 may be an elongated, narrow band of a rigid material (e.g., carbon steel) formed to be bowed during a resting state. In this manner, as the banded member mechanism 417 is actuated to pull (or push) the actuating disk 450 toward the center of the frame member 400, it forces each carbon steel band 455 to straighten out thereby applying a force on each end 470 of the frame member 400. The resulting forces applied to the ends 470 of the frame member 400 impart additional stiffness to the frame member 400.

The carbon steel bands 455 are seen from a cross-section view as shown in FIG. 4B. One can see, in this embodiment, six different carbon steel bands 455 are disposed within the interior of the frame member 400. Of course, a skilled artisan understands that this is the cross-section view and the shape of the carbon steel bands 455 with the bowed shape at rest can be seen better in the cutaway view of FIG. 3A.

In this embodiment, when stiffness of the motorcycle frame 110 is unneeded or undesired, the carbon steel bands 455 may be loosened to a position of rest and biased away from the inner walls of the frame member 400. When stiffness of the motorcycle frame 110 is needed or desired, the actuating disk 450 may be drawn to the center of the frame member 400 by using the threaded shaft 451.

Figure 5:
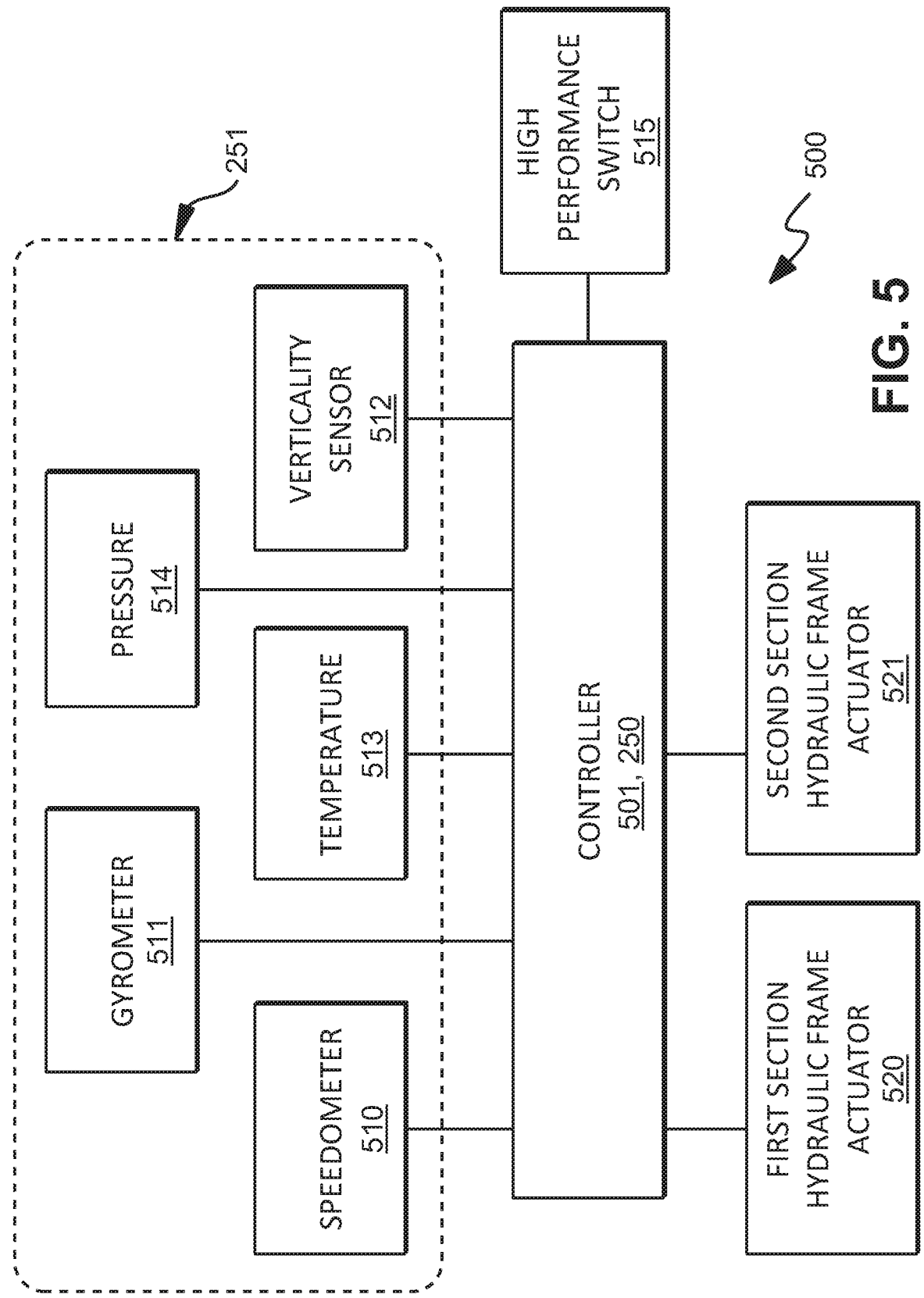
FIG. 5 is a block diagram of a dynamic stiffness motorcycle frame control system according to an embodiment of the subject matter disclosed herein.

FIG. 5 is a block diagram of a dynamic stiffness motorcycle frame control system 500 according to an embodiment of the subject matter disclosed herein. The system 500 includes a controller 501 for receiving input signals from various sensors that are part of the motorcycle itself or part of the dynamic stiffness motorcycle frame control system 500. The controller 501 further includes control signal outputs for controlling actuators for changing stiffness of the motorcycle frame 110 in response to the sensor inputs. The controller 501 may comprise a typical semiconductor microchip have a programmable microcontroller designed therein in the context of an application-specific integrated circuit (ASIC). The controller 501 may also be part of a larger overall controller (not shown) that handles several other control aspects of a motorcycle.

Several different sensors 251 (FIG. 2) may be part of the system 500. One sensor is a speedometer 510 for measuring overall speed of the motorcycle. Thus, as the speedometer 510 detects increases and decreases in speed of the motorcycle, stiffness of the motorcycle frame 110 may be controlled to have greater stiffness or reduced stiffness. In one control algorithm, stiffness of the motorcycle frame 110 increases linearly with an increase in speed. In another control algorithm, stiffness of the motorcycle frame 110 may increase exponentially with respect to a linear increase in speed and may decrease exponentially with a linear decrease in speed. In yet another control algorithm, stiffness of the motorcycle frame 110 may be incremented in a step-wise manner as the motorcycle speed reaches various threshold speeds.

Another sensor is a gyrometer 511 for measuring motion and/or orientation of the motorcycle. The gyrometer 511 may sense when a motorcycle is engaged in a power slide or other kind of high-gravitational force or centrifugal force turn. As the gyrometer 511 senses that additional frame stiffness may be needed, the controller 501 may increase frame stiffness accordingly. Decreases in frame stiffness may also be realized in response to coming out of power slides and high g-force turns. Related to the gyrometer 511, a more simple verticality sensor 512 may also provide a sensor input corresponding to the vertical orientation of the motorcycle (with respect to a normal gravitational force).

Other input sensors may include a temperature sensor 513 for sensing a temperature of hydraulic fluid or other fluids in the system 500. Further, a pressure sensor 514 for measuring fluid pressure inside various frame members may be used to provide control to the various mechanisms for increasing or decreasing stiffness. Lastly, a master high-performance switch 515 for engaging or disengaging the entire dynamic stiffness system 500 is provided.

The controller 501 may also control more than one mechanism associated with more than one section of the motorcycle frame 110. For example, a first section may be controlled by a first section actuator 520 corresponding to a central horizontal member of the motorcycle frame 110. The first section actuator 520 may be configured to actuate a controllable hydraulic chamber for dynamically adjusting the stiffness of the central horizontal member. Similarly, a second section may be controlled by a second section actuator 521 corresponding to a forward diagonal member of the motorcycle frame 110. The second section actuator 521 may be configured to actuate a controllable hydraulic chamber for dynamically adjusting the stiffness of the forward diagonal member. Additional sections may also be present in the motorcycle frame 110 and controlled by the controller 501.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A motorcycle frame comprising:
   a frame member;
   an elongated band mechanism positioned length-wise within the frame member, wherein the elongated band mechanism comprises a plurality of bowed rigid bands positioned length-wise within the frame member;
   an actuator coupled to the elongated band mechanism; and
   at least one controller coupled to the actuator and operable to actuate the elongated band mechanism so as to modify stiffness of the frame member.

2. A method for facilitating stiffness adjustment of a motorcycle frame, the method comprising:
   providing a frame member comprising an adjustable mechanism situated within the frame member, wherein the adjustable mechanism comprises a hydraulic chamber mechanism;
   providing an actuator to be coupled to the adjustable mechanism, wherein the actuator is operable to actuate the adjustable mechanism so as to adjust stiffness of the frame member during operation of the motorcycle frame; and
   providing a controller to be coupled to the actuator, wherein the controller is configurable to determine a performance parameter of the motorcycle frame during operation of the motorcycle frame and to control the actuator in response to the performance parameter.

* * * * *